(12) United States Patent
Becherucci et al.

(10) Patent No.: US 7,243,874 B2
(45) Date of Patent: Jul. 17, 2007

(54) APPARATUS AND METHODS FOR WINDING WIRE COILS FOR DYNAMO-ELECTRIC MACHINE COMPONENTS

(75) Inventors: Raffaele Becherucci, Scandicci (IT); Gianfranco Stratico, Siena (IT)

(73) Assignee: ATOP S.p.A., Firenze (IT)

( * ) Notice: Subject to any disclaimer, the term of this patent is extended or adjusted under 35 U.S.C. 154(b) by 315 days.

(21) Appl. No.: 10/851,721

(22) Filed: May 20, 2004

(65) Prior Publication Data

US 2005/0006519 A1    Jan. 13, 2005

Related U.S. Application Data

(60) Provisional application No. 60/472,862, filed on May 22, 2003.

(51) Int. Cl.
*H02K 15/085* (2006.01)
(52) U.S. Cl. ............... 242/432.5; 242/432.6; 242/447.1; 242/448; 29/605
(58) Field of Classification Search ............ 242/432.4, 242/432.5, 432.6, 433.2, 443, 447, 447.1; 29/596, 605
See application file for complete search history.

(56) References Cited

U.S. PATENT DOCUMENTS

| | | | | |
|---|---|---|---|---|
| 3,228,616 A | * | 1/1966 | Grosh | 242/437 |
| 3,397,850 A | * | 8/1968 | Anderson | 242/447.1 |
| 3,433,434 A | * | 3/1969 | Latter | 242/447.1 |
| 3,989,200 A | * | 11/1976 | Bachi | 242/437.3 |
| 4,078,735 A | * | 3/1978 | Klemer | 242/445 |
| 5,484,114 A | | 1/1996 | Santandrea et al. | |
| 5,511,733 A | * | 4/1996 | Kalsi | 242/437.3 |
| 5,681,006 A | * | 10/1997 | Herd et al. | 242/447.1 |
| 5,938,143 A | * | 8/1999 | Yukitake | 242/447 |
| 5,950,956 A | * | 9/1999 | Yukitake | 242/447.1 |
| 6,532,645 B1 | * | 3/2003 | Becherucci et al. | 29/596 |
| 6,533,208 B1 | | 3/2003 | Becherucci et al. | |
| 6,622,955 B2 | | 9/2003 | Stratico et al. | |
| 6,910,654 B2 | * | 6/2005 | Kawano et al. | 242/447.1 |
| 2003/0025026 A1 | | 2/2003 | Rieser et al. | |
| 2004/0046476 A1 | | 3/2004 | Becherucci et al. | |

* cited by examiner

*Primary Examiner*—Emmanuel M Marcelo
(74) *Attorney, Agent, or Firm*—Fish & Neave IP Group Ropes & Gray LLP

(57) ABSTRACT

Apparatus and methods for winding wire coils on a plurality of poles to be assembled to form a dynamo-electric machine component are provided. A plurality of holding members that each hold a respective pole while the wire coils are wound may be provided. Each holding member may be configured to rotate its respective pole about a central axis of the holding member. A plurality of wire dispensing members may be provided that each dispense wire onto a respective pole as each pole rotates about the central axis of its respective holding member. A support structure configured to support the plurality of wire dispensing members may be provided. The wire may be stratified on each pole by the simultaneous radial movement of the plurality of wire dispensers with respect to a central axis of the support structure.

33 Claims, 4 Drawing Sheets

APPARATUS AND METHODS FOR WINDING WIRE COILS FOR DYNAMO-ELECTRIC MACHINE COMPONENTS

This application claims the benefit of U.S. provisional patent application No. 60/472,862, filed May 22, 2003, which is hereby incorporated by reference herein in its entirety.

BACKGROUND OF THE INVENTION

The present invention relates to the formation of dynamo-electric machine components and, more particularly, to apparatus and methods for winding wire coils on support pockets or poles to be assembled to form a dynamo-electric machine component.

Apparatus and methods of this general nature are described, for example, in commonly-assigned Becherucci et al. U.S. Pat. No. 6,532,645 and Becherucci et al. U.S. patent publication No. US 2004/0046476, published on Mar. 11, 2004, both of which are hereby incorporated by reference herein in their entireties.

It would be desirable to provide improved apparatus and methods for winding wire coils on support pockets or poles to be assembled to form a dynamo-electric machine component.

SUMMARY OF THE INVENTION

In accordance with the present invention, apparatus and methods for winding wire coils on support pockets or poles are provided.

In some embodiments of the present invention, apparatus for winding wire coils on a plurality of poles to be assembled to form a dynamo-electric machine component may be provided. The apparatus may include a plurality of holding members that each hold a respective one of the plurality of poles while the wire coils are wound. Each holding member of the plurality of holding members may be configured to rotate its respective pole about a central axis of the pole. The apparatus may include a plurality of wire dispensing members that each dispense wire onto a respective one of the plurality of poles. The wire may be dispensed onto each pole as each pole rotates about its central axis. The apparatus may include a support structure configured to support the plurality of wire dispensing members. The wire may be stratified on each pole by the simultaneous radial movement of the plurality of wire dispensers with respect to a central axis of the support structure.

In some embodiments of the present invention, a method for winding wire coils on a plurality of poles to be assembled to form a dynamo-electric machine component may be provided. The method may include providing apparatus for winding the wire coils. Such apparatus may include a plurality of holding members that each hold a respective one of the plurality of poles while the wire coils are wound. The apparatus may include a plurality of wire dispensing members that each dispense wire onto a respective one of the plurality of poles. The apparatus may include a support structure configured to support the plurality of wire dispensing members. Each pole of the plurality of poles may be rotated about a central axis of the pole with its respective holding member such that the wire is dispensed onto each pole. The plurality of wire dispensers may be simultaneously moved radially with respect to a central axis of the support structure such that the wire is stratified on each pole.

In some embodiments of the present invention, apparatus for winding wire coils on a plurality of poles to be assembled to form a dynamo-electric machine component may be provided. The apparatus may include a plurality of holding members that each hold a respective one of the plurality of poles while the wire coils are wound. Each holding member of the plurality of holding members may be positioned at a first respective position while the wire coils are wound. The apparatus may include a plurality of wire dispensing members that each dispense wire onto a respective one of the plurality of poles. The apparatus may include a support structure configured to support the plurality of wire dispensing members. The wire may be dispensed onto each pole to wind the wire coils by the movement of the entirety of the support structure. The plurality of poles may be assembled to form the dynamo-electric machine component after the wire coils are wound by moving each holding member of the plurality of holding members to a second respective position.

In some embodiments of the present invention, a method for winding wire coils on a plurality of poles to be assembled to form a dynamo-electric machine component may be provided. The method may include providing apparatus for winding the wire coils. Such apparatus may include a plurality of holding members that each hold a respective one of the plurality of poles while the wire coils are wound. The apparatus may include a plurality of wire dispensing members that each dispense wire onto a respective one of the plurality of poles. The apparatus may include a support structure configured to support the plurality of wire dispensing members. Each holding member of the plurality of holding members may be positioned at a first respective position to wind the wire coils. The entirety of the support structure may be moved such that the wire is dispensed onto each pole to wind the wire coils. After the wire coils are wound, each holding member of the plurality of holding members may be moved to a respective second position to assemble the plurality of poles to form the dynamo-electric machine component.

Further features of the invention, its nature and various advantages will be more apparent from the accompanying drawings and the following detailed description.

DETAILED DESCRIPTION OF THE INVENTION

Figure 1:
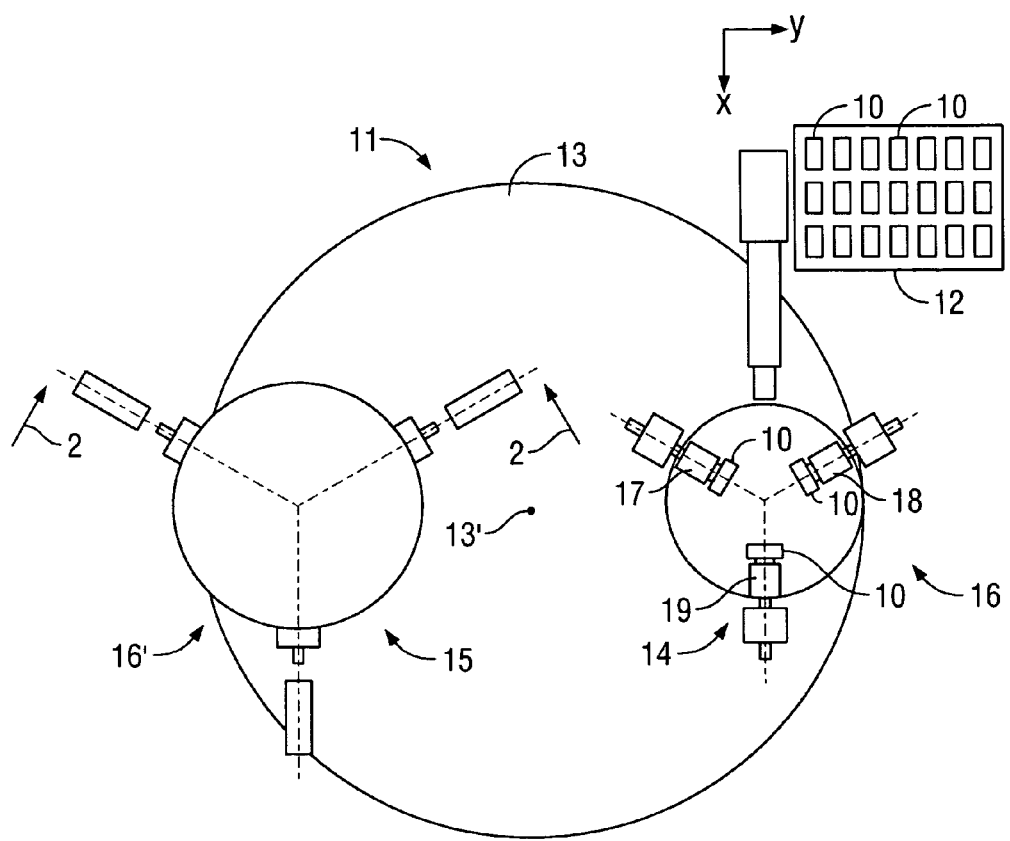
FIG. 1 is a schematic representation of the overall equipment which can be used for winding and terminating the coils in accordance with the present invention.

With reference to FIG. 1, pockets or poles 10 that need to be wound with coils may be presented to machine 11 by being located in carrying trays 12. (It should be noted that pockets or poles 10 may be referred to interchangeably as pockets or poles. For simplicity, however, pockets or poles 10 will be referred to herein as "poles.")

Machine 11 may be provided with a rotating transfer table 13 capable of rotation around center 13' to transfer holding units 14 and 15 of the transfer table between stations 16 and 16'.

The holding units may include holders 17, 18, and 19, each for holding a pole 10.

At station 16, the poles to be wound may be transferred from tray 12 to holders 17, 18, and 19 using, for example, a pick and place device capable of three orthogonal axis movements X, Y, and Z (into or out of the page of FIG. 1).

Figure 2:
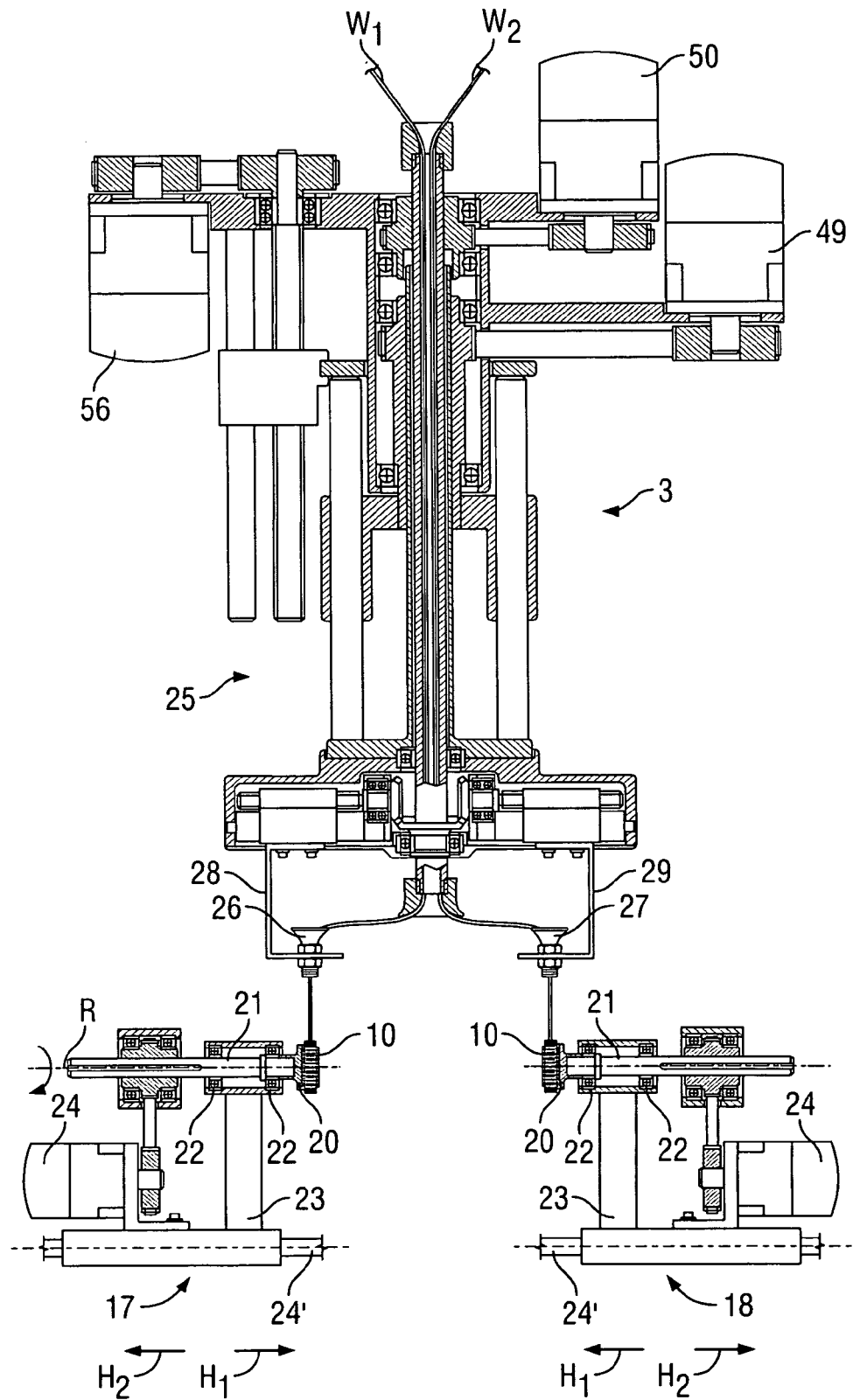
FIG. 2 is an elevational sectional view as seen from direction 2—2 of FIG. 1 in accordance with the present invention.

As shown in FIG. 2, holders 17, 18, and 19 may be provided with a clamping portion 20 for clamping the poles. The clamping portion is provided on the extremity of shaft 21, which is supported in bearings 22 of trolley structure 23. Motor belt unit 24, which is carried by trolley structure 23, is capable of rotating shaft 21 around axis R. Trolley structure 23 is capable of translating in directions $H_1$ (toward axis $A_1$ of FIG. 3) and $H_2$ (away from axis $A_1$ of FIG. 3) by means of guide 24' and a drive unit (not shown).

Figure 3:
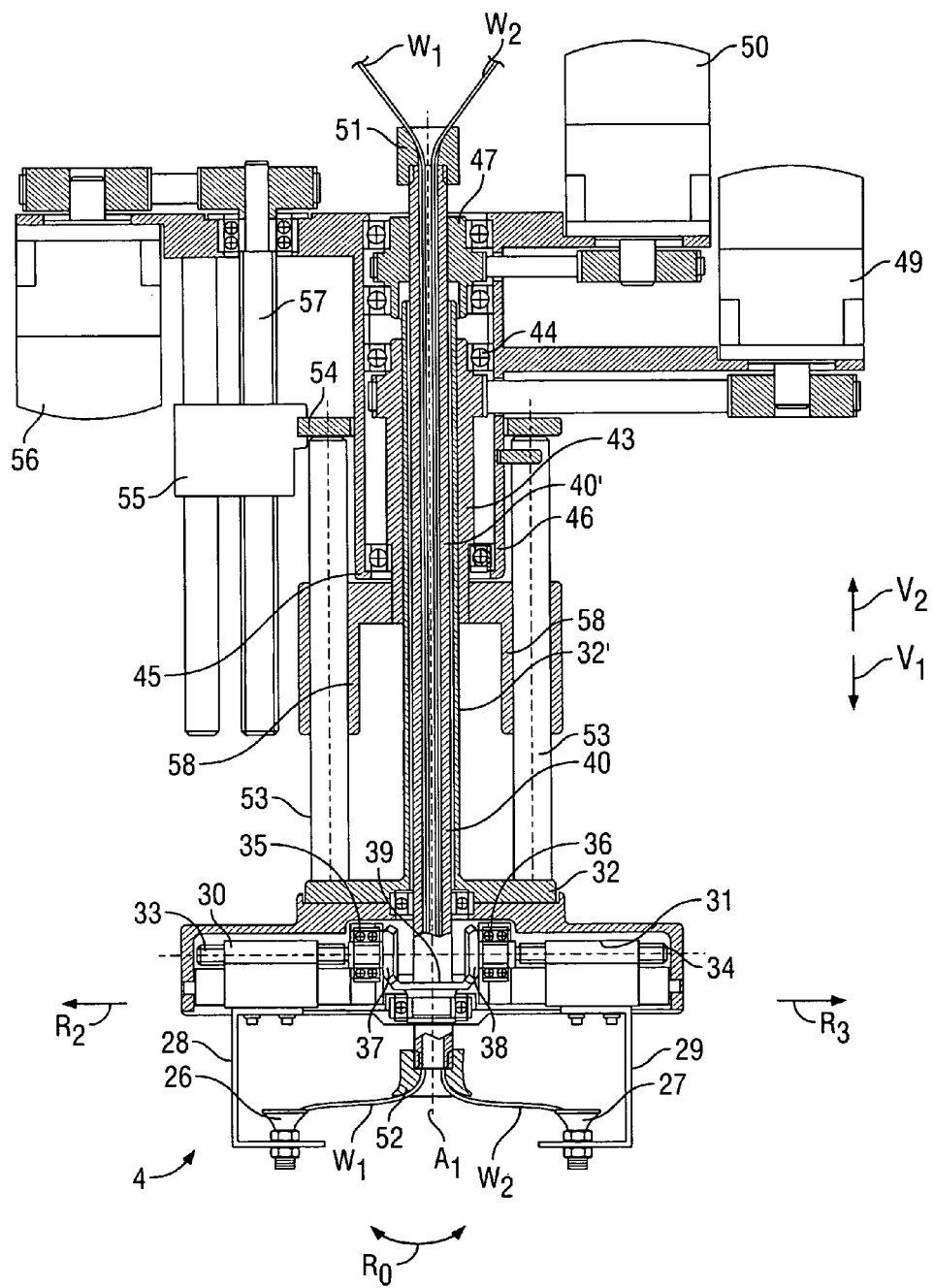
FIG. 3 is an enlarged view of area 3 of FIG. 2 in accordance with the present invention.

As shown in FIG. 3, winding unit 25 (adjacent to station 16') may include wire dispensers 26 and 27, each bolted to and supported by bracket plates 28 and 29. Each plate 28 and 29 may be bolted to a respective slide member 30 and 31. Slide members 30 and 31 are capable of translating backwards and forwards along respective radiuses $R_2$ and $R_3$, which intersect the central axis $A_1$ of winding unit 25. Radiuses $R_2$ and $R_3$ may be parallel to directions $H_1$ and $H_2$.

Winding unit 25 may include casing structure 32 having guide portions (not shown) for constraining slide members 30 and 31 to translate backwards and forwards along respective radiuses $R_2$ and $R_3$. Slide members 30 and 31 may receive and mesh with respective screw bars 33 and 34 so that rotations of the screw bars cause translation backwards and forwards along respective radiuses $R_2$ and $R_3$. Screw bars 33 and 34 are supported in bearings 35 and 36, respectively, to accomplish the rotations. Pinion gears 37 and 38 of screw bars 33 and 34 may mesh with a common crown gear 39. Common crown gear 39 may be integral to the end of shaft 40. Shaft 40 may be supported in bearings of casing structure 32. Shaft 40 is received in tubular portion 32' of casing structure 32. The opposite end portion 40' of shaft 40 is received in first gear tube 43 and second gear tube 47. First gear tube 43 may be supported by bearings 44 and 45, which are seated in a further casing structure 46. Further casing structure 46 corresponds to the frame of the machine. Second gear tube 47 may be supported by other bearings, which are also seated in further casing structure 46. Motor belt unit 49 is capable of rotating first gear tube 43, while motor belt unit 50 is capable of rotating second gear tube 47. Shaft 40 may be keyed on its outer surface to engage and slide in key ways of gear tube 47 in directions $V_1$ and $V_2$. Similarly, tubular portion 32' may be keyed on its outer surface to engage and slide in key ways of gear tube 43 in directions $V_1$ and $V_2$.

Shaft 40 may be hollow to allow wires $W_1$ and $W_2$ to run from a tensioner unit (not shown) to wire dispensers such as wire dispensers 26 and 27. Bushes 51 and 52 having flared surface portions may be assembled to the ends of shaft 40 to guarantee smooth running of wires $W_1$ and $W_2$ when entering and exiting shaft 40.

Guide bars 53 of casing structure 32 may allow movement in directions $V_1$ and $V_2$, parallel to axis $A_1$. Guide bars 53 are constrained to move in directions $V_1$ and $V_2$ by being received in guide sleeves 58 of the frame of the machine. Shaft 40 will also move in directions $V_1$ and $V_2$ with casing structure 32. Joint member 54 may couple guide bars 53 to carriage member 55. Carriage member 55 may be translated in directions $V_1$ and $V_2$ by motor belt unit 56 and rotating screw arrangement 57, which is in meshing arrangement with carriage member 55. Guide sleeves 58 may be coupled to first gear tube 43 (e.g., using a force fit).

Figure 4:
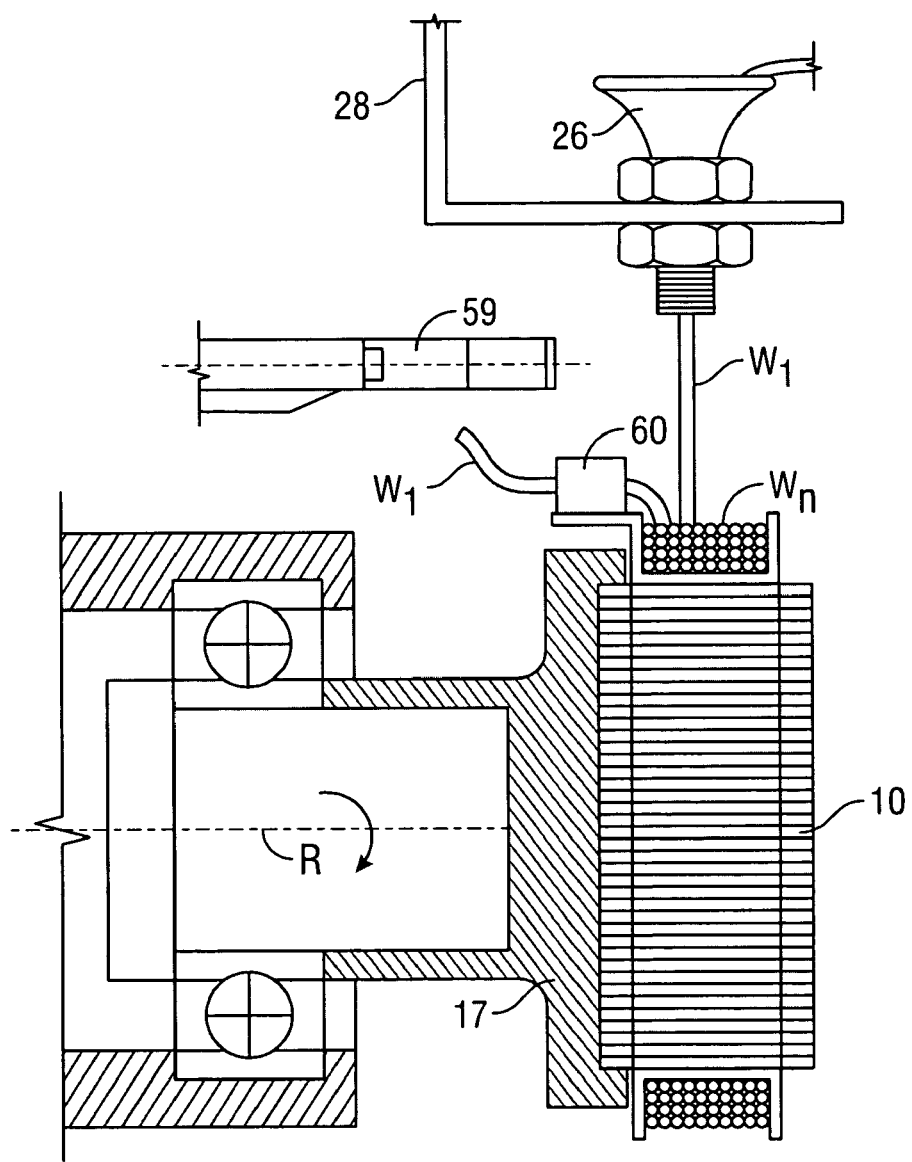
FIG. 4 is an enlarged view of area 4 of FIG. 3 in accordance with the present invention.

Operations of the aforementioned winding unit may be as follows, as shown in FIG. 4: prior to starting winding of wires $W_1$ and $W_2$, the end portions of wires $W_1$ and $W_2$ may be anchored to anchoring posts 60 of pockets or poles 10 by lead pullers 59. Wires $W_1$ and $W_2$ may then be pulled around pockets or poles 10 by rotations around axis R on behalf of motor belt unit 24. At the same time, motor belt unit 50 may rotate shaft 40 so that the wire dispensers are translated backwards and forwards along respective radiuses $R_2$ and $R_3$ to stratify turns of wire $W_1$ and $W_2$ being wound on the pockets or poles by rotation around axis R. In addition, motor belt unit 56 may be rotated to move the wire dispensers in directions $V_1$ or $V_2$ to pass the wire turns $W_n$ from one layer to another on the pockets or poles. This stratification and layer formation of the wire turns $W_n$ around the pockets or poles is shown, for example, in FIG. 4.

Referring back to FIG. 3, motor unit 49 may cause rotations $R_o$ of casing structure 32 around axis $A_1$ in order to use rotation $R_o$ for indexing wire dispensers around axis $A_1$, so that other pockets or poles (not shown) present on further holders (not shown) can be wound in the same way that has been described hereinabove. Translation of trolley structure 23 in direction $H_2$ (FIG. 2) may be used to create sufficient space between adjacent holders for their rotations around axis R and for the movements of the wire dispensers.

Rotation $R_o$, translations $V_1$ and $V_2$, and movements on radiuses $R_2$ and $R_3$ which move the wire dispensers with respect to the poles may be used by themselves or along with lead pull operations to route the ends of wires $W_1$ and $W_2$ in relation to the poles, as is required in termination operations.

Once the poles have been wound and terminated in station 16', they may be returned to station 16 where they can be assembled together to form the wound stator core.

In an alternative embodiment, wire coils may be wound on poles 10 by translating casing structure 32 in direction $V_1$, rotating casing structure 32 in an initial direction $R_o$ around axis $A_1$, translating casing structure 32 in direction $V_2$, and rotating the casing structure in a direction opposite to the initial $R_o$ direction. Such movements brings wire dispensers 26 and 27 around respective poles 10 for one full turn of coil. To stratify the wire on each pole 10, wire dispensers 26 and 27 may be translated in directions $R_2$ and $R_3$. In such an embodiment, holders 17 and 18 may be moved in direction $H_2$ such that poles 10 are spaced at a sufficient distance apart to allow for the wire coils to be wound on the poles. Once poles 10 have been wound with the wire coils, poles 10 may be moved in direction $H_1$ to position the poles closer to one another for assembly of the dynamo-electric machine component.

It will be understood that the foregoing is only illustrative of the principles of the present invention, and that still other modifications can be made by those skilled in the art without departing from the scope and spirit of the invention.

What is claimed is:

1. Apparatus for winding wire coils on a plurality of poles to be assembled to form a dynamo-electric machine component, comprising:
   a plurality of holding members that each hold a respective one of the plurality of poles while the wire coils are wound, wherein each holding member of the plurality of holding members is configured to rotate its respective pole about a central axis of the holding member;

a plurality of wire dispensing members that each dispense wire onto a respective one of the plurality of poles, wherein the wire is dispensed onto each pole as each pole rotates about the central axis of its respective holding member; and a support structure configured to support the plurality of wire dispensing members, wherein the wire is stratified on each pole by the simultaneous radial movement of the plurality of wire dispensing members with respect to a central axis of the support structure.

2. The apparatus of claim 1, wherein each of the holding members is further configured to translate its respective pole toward and away from the central axis of the support structure.

3. The apparatus of claim 2, wherein the translational movement of each pole is parallel to the radial movement of its respective wire dispensing member.

4. The apparatus of claim 1, further comprising:
a shaft member supported by the support structure and positioned about the central axis of the support structure, wherein a rotation of the shaft member about the central axis of the support structure provides for the simultaneous radial movement of the plurality of wire dispensing members.

5. The apparatus of claim 4, wherein the shaft member is keyed to a sleeve member such that rotation of the sleeve member is imparted on the shaft member.

6. The apparatus of claim 1, further comprising:
a transfer table configured to support the plurality of holding members and rotate about the center of the transfer table such that the plurality of holding members are transferred from a location for winding the wire coils to a location for forming the dynamo-electric machine component.

7. The apparatus of claim 1, wherein the plurality of holding members are arranged in a circle.

8. The apparatus of claim 1, further comprising:
a tubular structure supported by the support structure and positioned along the central axis of the support structure, wherein a rotation of the tubular structure about the central axis of the support structure rotates the entirety of the support structure about the central axis of the support structure.

9. The apparatus of claim 8, wherein the rotation of the entire support structure about the central axis of the support structure indexes the wire dispensing members from a first plurality of poles to a second plurality of poles.

10. The apparatus of claim 8, wherein the tubular structure is keyed to a sleeve member such that rotation of the sleeve member is imparted on the tubular structure.

11. The apparatus of claim 1, further comprising:
a guide bar supported by the support structure configured to translate the entirety of the support structure along the central axis of the support structure.

12. The apparatus of claim 11, wherein the guide bar is coupled to a carriage member such that translational motion of the carriage member is imparted on the guide bar.

13. The apparatus of claim 1, wherein each of the plurality of holding members comprises an anchoring member to anchor an end of the wire prior to winding the wire on the respective pole.

14. The apparatus of claim 1, wherein an end of a wire wound on a pole is routed for termination by the radial movement of the plurality of wire dispensing members with respect to the central axis of the support structure, a rotation of the entirety of the support structure about the central axis of the support structure, or a translation of the entirety of the support structure along the central axis of the support structure.

15. The apparatus of claim 1, further comprising:
a tubular structure supported by the support structure and positioned along the central axis of the support structure, wherein a rotation of the tubular structure about the central axis of the support structure rotates the entirety of the support structure about the central axis of the support structure;

a guide bar supported by the support structure configured to translate the entirety of the support structure along the central axis of the support structure; and wherein an end of a wire wound on a pole is routed for termination by the radial movement of the plurality of wire dispensing members with respect to the central axis of the support structure, the rotation of the entirety of the support structure about the central axis of the support structure, or the translation of the entirety of the support structure along the central axis of the support structure.

16. A method for winding wire coils on a plurality of poles to be assembled to form a dynamo-electric machine component, comprising:

providing apparatus for winding the wire coils comprising a plurality of holding members that each hold a respective one of the plurality of poles while the wire coils are wound, a plurality of wire dispensing members that each dispense wire onto a respective one of the plurality of poles, and a support structure configured to support the plurality of wire dispensing members;

rotating each pole of the plurality of poles about a central axis of its respective holding member with its respective holding member such that the wire is dispensed onto each pole; and simultaneously moving the plurality of wire dispensing members radially with respect to a central axis of the support structure such that the wire is stratified on each pole.

17. The method of claim 16, further comprising:
translating each of the poles toward and away from the central axis of the support structure with its respective holding member.

18. The method of claim 17, wherein the translational movement of each pole is parallel to the radial movement of its respective wire dispensing member.

19. The method of claim 16, wherein the apparatus further comprises a shaft member supported by the support structure and positioned about the central axis of the support structure, and wherein simultaneously moving the plurality of wire dispensing members radially with respect to a central axis of the support structure comprises rotating the shaft member about the central axis of the support structure to provide for the simultaneous radial movement.

20. The method of claim 19, wherein the apparatus further comprises a sleeve member keyed to the shaft member, and wherein rotating the shaft member about the central axis of the support structure comprises rotating the sleeve member to provide for the rotation of the shaft member.

21. The method of claim 16, wherein the apparatus further comprises a transfer table configured to support the plurality of holding members, the method further comprising:
transferring the plurality of holding members from a location for winding the wire coils to a location for forming the dynamo-electric machine component by rotating the transfer table about the center of the transfer table.

22. The method of claim 16, wherein the plurality of holding members are arranged in a circle.

23. The method of claim 16, wherein the apparatus further comprises a tubular structure supported by the support structure and positioned along the central axis of the support structure, the method further comprising:
rotating the entirety of the support structure about the central axis of the support structure by rotating the tubular structure about the central axis of the support structure.

24. The method of claim 23, wherein rotating the entirety of the support structure about the central axis of the support structure comprises indexing the wire dispensing members from a first plurality of poles to a second plurality of poles.

25. The method of claim 23, wherein the apparatus further comprises a sleeve member keyed to the tubular structure, and wherein rotating the tubular structure about the central axis of the support structure comprises rotating the sleeve member to provide for the rotation of the tubular structure.

26. The method of claim 16, wherein the apparatus further comprises a guide bar supported by the support structure, the method further comprising:
translating the entirety of the support structure along the central axis of the support structure with the guide bar.

27. The method of claim 26, wherein the apparatus further comprises a carriage member, and wherein translating the entirety of the support structure along the central axis of the support structure comprises translating the carriage member to provide for the translation of the support structure.

28. The method of claim 16, wherein each of the plurality of holding members comprises an anchoring member, the method further comprising:
anchoring an end of the wire with the anchoring member prior to winding the wire on the respective pole.

29. The method of claim 16, the method further comprising:
routing an end of a wire wound on a pole for termination by radially moving the plurality of wire dispensing members with respect to the central axis of the support structure, rotating the entirety of the support structure about the central axis of the support structure, or translating the entirety of the support structure along the central axis of the support structure.

30. Apparatus for winding wire coils on a plurality of poles to be assembled to form a dynamo-electric machine component, comprising:
a plurality of holding members that each hold a respective one of the plurality of poles while the wire coils are wound, wherein each holding member of the plurality of holding members is positioned at a first respective position while the wire coils are wound;
a plurality of wire dispensing members that each dispense wire onto a respective one of the plurality of poles; and
a support structure configured to support the plurality of wire dispensing members, wherein the wire is dispensed onto each pole to wind the wire coils by the movement of the entirety of the support structure, and wherein the plurality of poles are assembled to form the dynamo-electric machine component after the wire coils are wound by moving each holding member of the plurality of holding members to a second respective position.

31. The apparatus of claim 30, wherein the wire is stratified on each pole by the simultaneous radial movement of the plurality of wire dispensing members with respect to a central axis of the support structure.

32. A method for winding wire coils on a plurality of poles to be assembled to form a dynamo-electric machine component, comprising:
providing apparatus for winding the wire coils comprising a plurality of holding members that each hold a respective one of the plurality of poles while the wire coils are wound, a plurality of wire dispensing members that each dispense wire onto a respective one of the plurality of poles, and a support structure configured to support the plurality of wire dispensing members;
positioning each holding member of the plurality of holding members at a first respective position to wind the wire coils;
moving the entirety of the support structure such that the wire is dispensed onto each pole to wind the wire coils; and
after the wire coils are wound, moving each holding member of the plurality of holding members to a respective second position to assemble the plurality of poles to form the dynamo-electric machine component.

33. The method of claim 32, further comprising:
simultaneously moving the plurality of wire dispensing members radially with respect to a central axis of the support structure such that the wire is stratified on each pole during the winding of the wire coils.

* * * * *